United States Patent [19]

Welter

[11] 4,341,249

[45] Jul. 27, 1982

[54] COMPRESSION SIDEWALL TIRE REINFORCED FOR DEFLATED OPERATION

[75] Inventor: Thomas N. H. Welter, Keispelt, Luxembourg

[73] Assignee: The Goodyear Tire & Rubber Company, Akron, Ohio

[21] Appl. No.: 290,534

[22] Filed: Aug. 6, 1981

Related U.S. Application Data

[63] Continuation of Ser. No. 99,693, Dec. 3, 1979, abandoned.

[51] Int. Cl.³ .................. B60C 17/00; B60C 13/00
[52] U.S. Cl. .................. 152/330 RF; 152/353 R; 152/362 R; 152/354 R; 152/353 G
[58] Field of Search ........ 152/330 R, 330 RF, 330 L, 152/352 R, 352 A, 353 R, 353 C, 353 G, 354 R, 354 RB, 357 A, 362 R; 156/125, 128 P

[56] References Cited

U.S. PATENT DOCUMENTS

| | | | |
|---|---|---|---|
| 3,631,913 | 1/1972 | Boileau | 152/353 R |
| 3,782,440 | 1/1974 | Depmeyer | 152/330 R |
| 3,840,060 | 10/1974 | Tangorra | 152/353 R |
| 3,850,218 | 11/1974 | Bertelli et al. | 152/353 C |
| 3,861,438 | 1/1975 | Bertelli et al. | 152/330 RF |
| 3,877,503 | 4/1975 | Tangorra et al. | 152/362 R X |
| 4,059,138 | 11/1977 | Mirtain et al. | 152/352 A |

FOREIGN PATENT DOCUMENTS

| | | |
|---|---|---|
| 2827248 | 1/1979 | Fed. Rep. of Germany . |
| 2828642 | 1/1979 | Fed. Rep. of Germany . |
| 1471883 | 4/1977 | United Kingdom . |

Primary Examiner—Edward C. Kimlin
Assistant Examiner—Lois E. Boland
Attorney, Agent, or Firm—M. W. Goodwin

[57] ABSTRACT

A compression sidewall tire reinforced for operation while deflated. A pair of junction portions connect the sidewalls and shoulders. Each of the shoulders extends axially outward and radially inward from the tread, and each of the sidewalls extends axially outward and radially outward from the mounting portions. The sidewalls are constrained against outward expansion by the rim and junction portions. The shoulders are reinforced with a plurality of circumferentially spaced ribs to resist movement toward the ground when the tire is deflated and under normal load. A circumferentially continuous rib may also be positioned on the exterior surface of each junction portion to further reinforce the tire.

8 Claims, 4 Drawing Figures

COMPRESSION SIDEWALL TIRE REINFORCED FOR DEFLATED OPERATION

This application is a continuation of U.S. patent application Ser. No. 99,693, filed Dec. 3, 1979, now abandoned.

This invention relates to compression sidewall tires and especially to tires adapted to operate in the deflated condition.

Conventional pneumatic tires have a ply reinforcement structure extending around the carcass from bead to bead. Without such a structure, the tires have a tendency to "grow"; i.e., expand outwardly without constraint as the cavity therein is pressurized. In recent years, the compression sidewall tire has been developed which has eliminated the need for reinforcing cords in the sidewall and bead regions. Because these regions are devoid of such cords, the manufacture of this tire is particularly suited for methods such as casting, pouring, or injection molding.

In the compression sidewall tire, each sidewall is constructed so that its cross section in a radial plane has a concave exterior surface and a convex interior surface. A "radial plane" as used herein is a plane which includes the axis of rotation of a tire. For the compression sidewall tire to operate, it is required that the sidewalls be constrained between the rim at one end and a constraining means such as a tread belt at the other end. When the tire cavity is inflated to normal inflation pressure, the interior forces due to air pressure against the sidewalls have the tendency to compress the elastomeric material of the sidewalls. If the elastomeric material is compressed beyond a certain point, the interior forces will cause the sidewalls to expand axially outward. The sidewalls must therefore have sufficient bending stiffness, curvature and thickness, in accordance with good design practice, to resist this resultant force so that the sidewalls can be constrained.

A primary problem encountered with compression sidewall tires as well as conventional tires during operation in the deflated condition is the destructive heat buildup which results from the abrasion of the interior surfaces of the tire during the interval of travel of each portion of the tire as it moves through the tire's footprint.

Another problem with compression sidewall tires operating in the deflated condition is the scrubbing of the shoulder and sidewall region against the ground. This scrubbing occurs because portions of the shoulders and sidewalls radially inward of the tread have a lesser circumference than the circumference of the tread. All portions of the tire must travel at the same angular velocity and therefore the linear velocity of those portions of the sidewalls and shoulders which contact the ground when the tire is deflated must be greater than the linear velocity of the tread. Thus, scrubbing of the sidewalls and shoulders against the ground will occur under these conditions.

With the construction of this invention, the tire is reinforced to minimize the abrasion and scrubbing action experienced with deflated tires. The shoulders of the tire also extend outwardly so that the sidewalls fold in an orderly manner during operation in the deflated condition and lie axially outward of the rim seating surfaces. The term "axially" as used in this specification and the claims refers to a direction along a line parallel to the axis of rotation of the tire. The term "radially" refers to a direction perpendicular to the axis of rotation of the tire.

If internal contact of portions of the tire occurs during deflated use, the tire is constructed such that this contact will occur primarily between the sidewalls and shoulders. The shoulders are constructed to extend radially inward from the tread whereby the resulting abrasion between internal surfaces is lessened. The shoulders are also provided with ribs for stiffening purposes to maintain them out of engagement with the ground during deflated use of the tire. This helps to eliminate scrubbing while incurring a minimum addition of weight. Hoop strength is provided to the tire in the areas where the sidewalls and shoulders meet (junction portions) to maintain the upstanding characteristic of the shoulders. "Hoop strength" refers to the strength resulting from applying a band or hoop around an object. This hoop strength also aids in constraining the sidewalls.

Briefly, one aspect of this invention involves a tire suitable for operating in the inflated and deflated condition comprising an annular body of elastomeric material, a circumferentially extending ground-engaging tread portion at the outer periphery of said body, a pair of shoulder portions joining said tread portion and extending axially outward and radially inward from said tread portion to a pair of junction portions, a pair of sidewalls extending radially and axially inward from said junction portions to a pair of spaced-apart mounting portions for mounting on a rim, a circumferentially continuous reinforcing ply structure extending between said junction portions, a plurality of circumferentially spaced reinforcing ribs on at least one surface of each of said shoulder portions and said ribs extending from said junction portions to said tread portion.

Another aspect of this invention involves a tire suitable for operating in the inflated and deflated condition comprising an annular body of elastomeric material, a circumferentially extending ground-engaging tread portion at the outer periphery of said body, a pair of shoulder portions joining said tread portion and extending axially outward and radially inward from said tread portion to a pair of junction portions, a pair of sidewalls extending radially and axially inward from said junction portions to a pair of spaced-apart mounting portions for mounting on a rim, a circumferentially continuous reinforcing ply structure extending between said junction portions, and at least one circumferentially continuous reinforcing rib on the exterior surface of each of said junction portions, said rib extending completely around said tire.

Still another aspect of the invention involves a tire suitable for operating in the inflated and deflated condition comprising an annular body of elastomeric material, a circumferentially extending ground-engaging tread portion at the outer periphery of said body, a pair of shoulder portions joining said tread portion and extending axially outward and radially inward from said tread portion to a pair of junction portions, a pair of sidewalls extending radially and axially inward from said junction portions to a pair of spaced-apart mounting portions for mounting on a rim, a circumferentially continuous reinforcing ply structure extending between said junction portions, said reinforcing ply structure including at least two overlapping layers of reinforcing cords extending from said tread portion to said junction portions, said cords of one of said overlapping layers being in opposing relation to said cords of the other of said overlapping layers, and said cords of said overlapping layers being positioned at an angle of 35 to 55 degrees relative to the midcircumferential plane of said tire.

In accordance with a further aspect of this invention, there is provided a compression sidewall tire suitable for operating in the deflated condition.

In accordance with a still further aspect of this invention, there is provided a tire which can be easily manufactured by such methods as casting, pouring, or injection molding.

In accordance with yet another aspect of this invention there is provided a reinforced tire structure to support the shoulders and sidewalls during operation in the inflated and deflated conditions.

Figure 1:
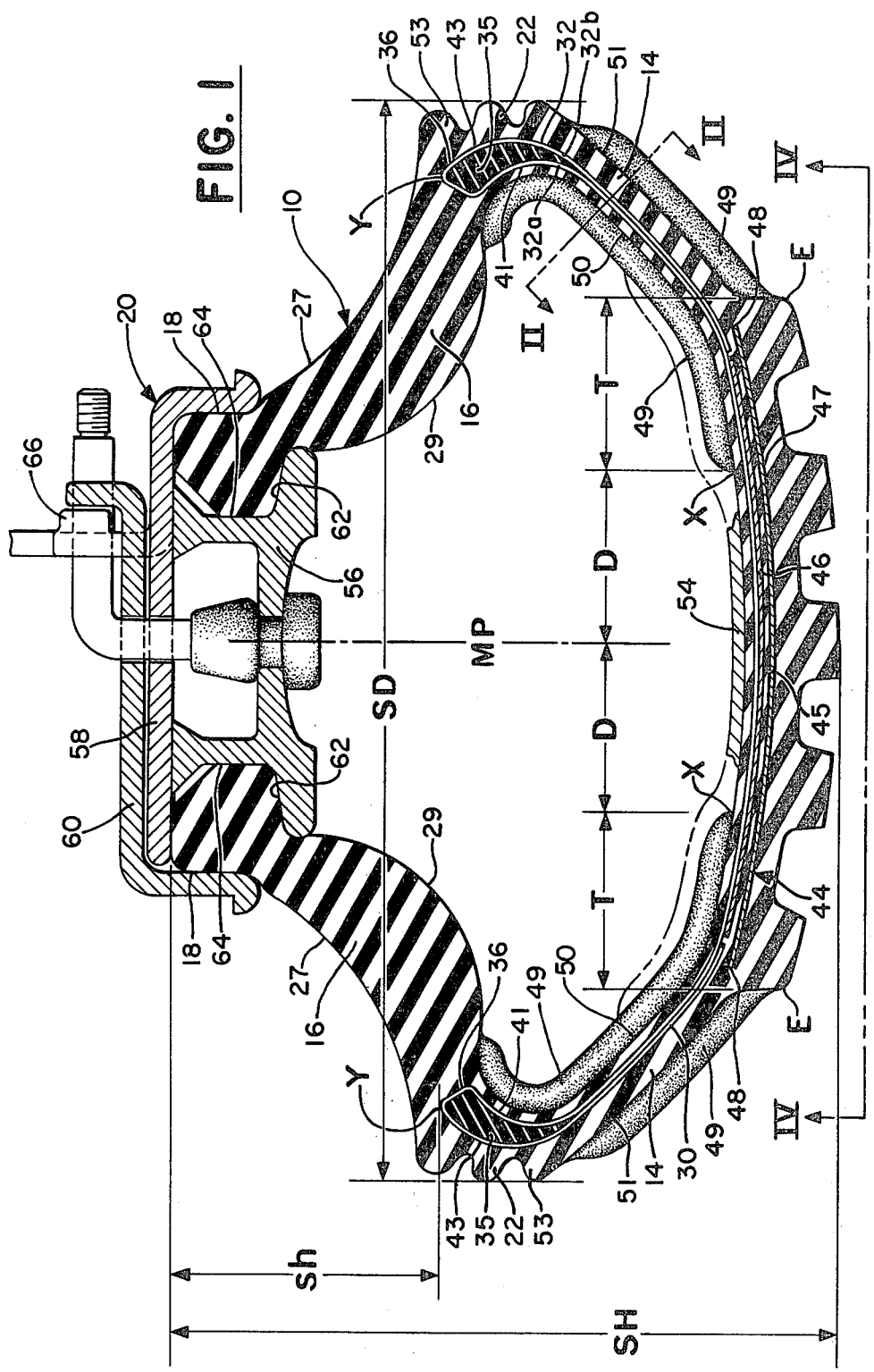
FIG. 1 is a partial cross-sectional view taken in a radial plane of a tire embodying the present invention showing the tire in the unloaded and inflated condition mounted on a rim.

Referring to FIG. 1, this invention relates to a tire 10 of the pneumatic type which has a circumferentially extending, ground-engaging tread 12, a pair of shoulders 14 joined to the tread, and a pair of sidewalls 16 terminating in a pair of mounting portions 18 for engagement with a rim 20. A pair of junction portions 22 connect the shoulders 14 and sidewalls 16. Each of these parts of the tire 10 are preferably made of an elastomeric material such as rubber or urethane. The tire 10 is symmetrical with respect to the midcircumferential plane MP of the tire. The midcircumferential plane MP is a plane perpendicular to the axis of rotation of a tire and midway between the two axially outer extremities of the tire.

Tread width is defined by the axially outer extremities of a tire which engage the ground in the footprint of the tire while the tire is under normal inflation pressure and load. The footprint of a tire refers to the tread marks or pattern left by a tire in contact with the ground when mounted in normal fashion on a vehicle under normal load and inflated to normal inflation pressure. Normal loads and inflation pressures are those for which a tire is designed to operate under normal conditions.

Each of the shoulders 14 extends axially outward and radially inward from the tread 12. Each of the sidewalls 16 extends axially outward and radially outward from each of the respective mounting portions 18 such that maximum section width SD of the tire 10 is at the junction portions 22. The maximum section width of a tire is the maximum distance in a cross section taken in a radial plane of the tire between the axially outermost surfaces of the tire, exclusive of lettering or indicia, as measured on a line parallel to the axis of rotation of the tire. Accordingly, the junction portions 22 are the axially outermost portions of the tire 10 when the tire is under normal inflation pressure and load.

Figure 3:
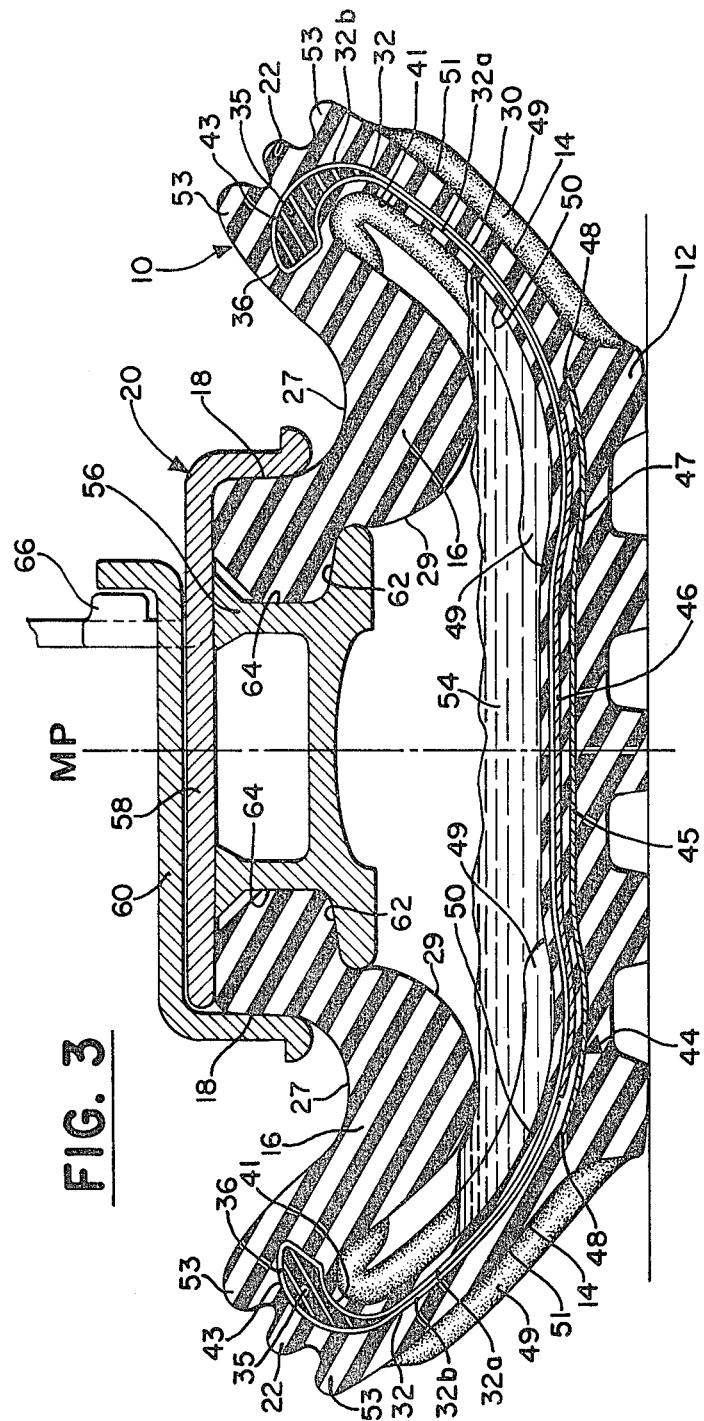
FIG. 3 is a partial cross-sectional view similar to that of FIG. 1 showing the tire under normal load and in the deflated condition.

As shown in FIGS. 1 and 3, the length of the shoulders 14 is approximately the same as the length of the sidewalls 16 although the shoulder and sidewall lengths may vary depending on design considerations. Furthermore, the section height (sh) of each sidewall 16 is preferably less than half of the section height SH of the tire 10. The section height SH of the tire 10, for the purposes of this specification and the claims, is the distance along a line perpendicular to the axis of rotation between the radially innermost seating surface of the mounting portions and the radially outermost point on the exterior surface of the tread 12 when the tire is under normal inflation pressure and not under load. The radially outermost point of a sidewall is defined as the radially innermost point Y of the reinforcing ply cords in the tire. The section height (sh) of each sidewall is the distance along a line perpendicular to the axis of rotation in a radial plane of the tire between the radially innermost seating surface of the mounting portions and the radially outermost point of the sidewall.

The sidewalls 16 are preferably made of high modulus elastomeric material and, as shown in FIGS. 1 and 3, have a concave exterior surface 27 and a convex interior surface 29. A tire 10 with this type of sidewall configuration is well known in the prior art and is commonly called a "compression sidewall" tire. The sidewalls 16 have substantially thicker walls than are commonly found in conventional tires. The shoulders 14 have relatively thin walls and the wall thickness of the shoulders is less than the thickness of the sidewalls 16.

The tire 10 also has a reinforcing ply structure 30 extending between the junction portions 22. This structure 30 includes a layer or ply 32 of reinforcing cords. Preferably, the ply 32 extends between the junction portions 22 where it is folded in each junction portion around a stiffening means or bead 35 into overlapping relationship with itself to form a radially inner layer 32a and a radially outer layer 32b. In this embodiment, the bead 35 has a modulus of elasticity of at least 100 kg/cm$^2$ at 10 percent elongation, its strength being greater than the strength of the surrounding elastomeric material. The bead 35 extends circumferentially entirely around the tire 10 and is preferably of an elastomeric or rubbery material, but is not limited thereto. For example, the bead 35 could be made of a fibrous material. The folded portion of the radially inner ply 32 around the bead 35 extends in a closed loop around the circumference of the tire 10 to form a substantially stiff turnup hoop 36 for transmitting forces from the reinforcing ply structure 30 and constraining the sidewalls 16 between the rim 20 and the junction portions 22. The turnup hoop 36 preferably is curved and has a concave inner surface 41 and convex outer surface 43 as shown in FIG. 1.

Figure 4:
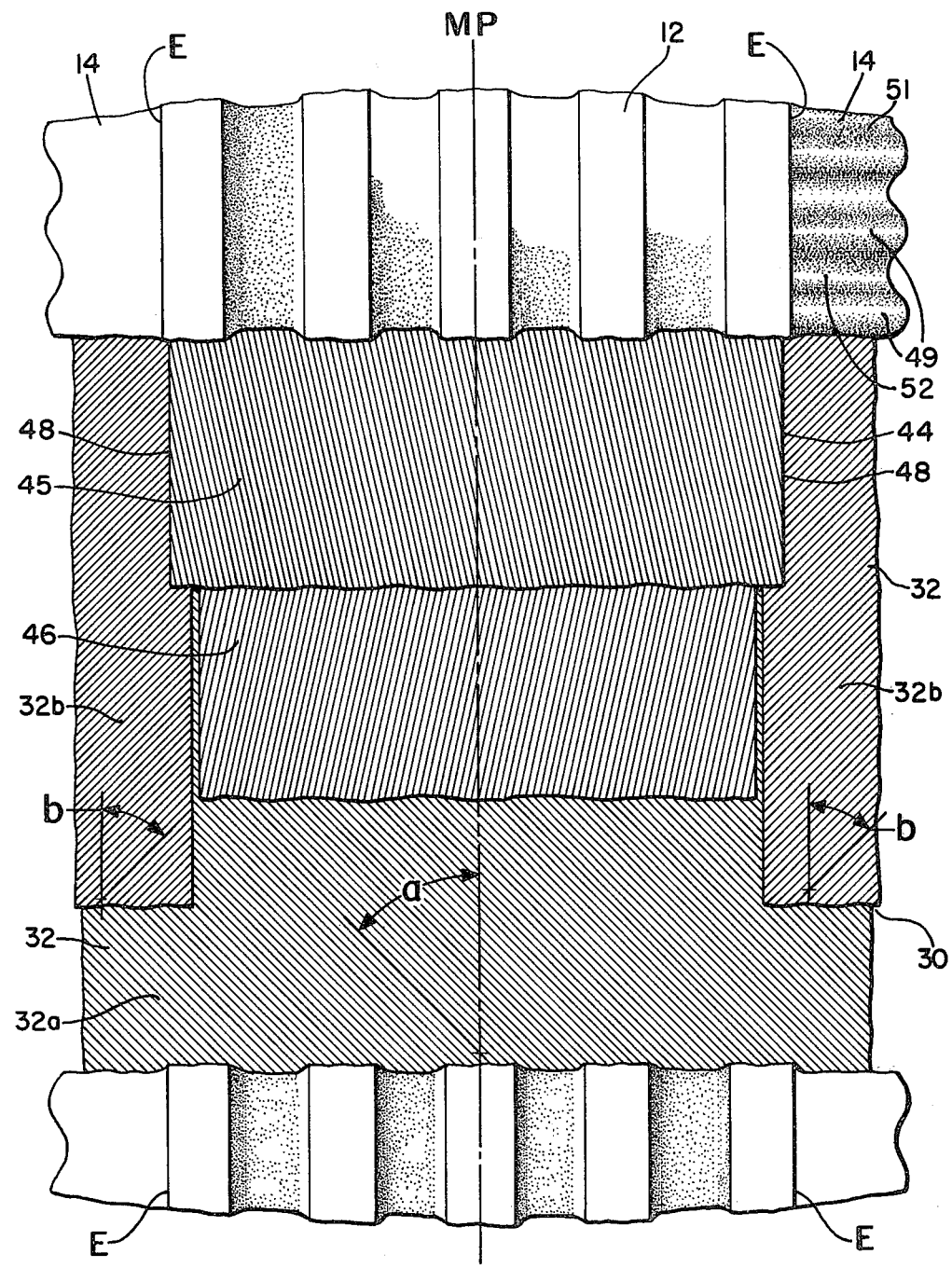
FIG. 4 is a fragmentary view of the tread portion taken along the line IV—IV in FIG. 1 with parts being broken away to show the angular cord relationship of the breaker and reinforcing ply.

As shown in FIGS. 1 and 3, a substantially inextensible annular tread-reinforcing breaker structure 44 is located radially inward of the tread 12. As shown in FIG. 4, this structure 44 includes two breaker layers 45 and 46 of parallel cords oriented at acute angles relative to the midcircumferential plane MP of the tire 10, the angle of one layer being in an opposed direction to the angle of the other layer. The annular breaker structure 44 extends circumferentially around the tire 10 for reinforcement of the tread 12 and may be of any known construction and made of any desired material consistent with good engineering practice. The axial width of the radially outer breaker layer 45 is preferably substantially equal to the axial width of the tread 12 and greater than the axial width of the radially inner breaker layer 46 so that the radially outer breaker layer overlaps the inner breaker layer.

The radially outer layer or ply 32 extends from the turnup hoop 36 through the shoulder 14 and preferably to a point radially inward of the tread 12 adjacent the respective axially outer edge of the radially inner breaker layer 46 and axially inward of the axially outer edge of the radially outer breaker layer 45. Where the ply 32 extends axially entirely across crown portion 47 of the tire 10 radially inward of the tread 12, as in the present embodiment, the breaker structure 44 may be omitted. If a breaker structure 44 is provided, then the ply 32 need extend axially inward from each shoulder 14 only to a point overlapping a respective edge 48 of the annular breaker structure. In such a case, each shoulder area of the tire 10 would be reinforced by separate layers of reinforcing cords.

In the preferred embodiment of this invention, the angle (a) of the cords in ply 32 is 45 degrees with respect to the midcircumferential plane MP of the tire 10, but this angle may range between 35 degrees and 55 degrees. The angle (a) of the cords in the radially inner layer 32a of ply 32 is opposed to the angle (b) of the cords in the overlapping radially outer layer 32b of the ply. These cords in ply 32 primarily reinforce the tire 10 against shear stresses.

Figure 2:
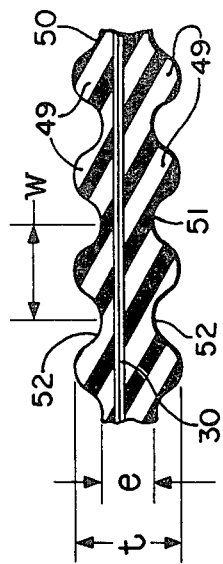
FIG. 2 is an enlarged, fragmentary, cross-sectional view of a portion of the tire taken along line II—II of FIG. 1.

Reinforcement means such as ribs 49 on the shoulders 14 support the shoulders so that they are maintained out of engagement with the ground when the tire 10 is deflated and under normal load. The ribs 49 may include solid pieces of stiff ribber or the like but preferably comprise a plurality of ribs, as shown in FIG. 2, located at circumferentially spaced positions about the tire 10 on both the interior and exterior surfaces 50 and 51 of the shoulders 14. The ribs 49 on the interior surface 50 preferably extend from the junction portion 22 along the interior surface of the tire 10 to positions, indicated by letter X in FIG. 1, which are at least axially inward of axially outer edges E of the tread 12. Each of the positions X is preferably located such that distance D between the position X and the midcircumferential plane MP is not less than distance T between the positions X and the axially outer edges E of the tread 12. Preferably, the positions X are located so that the distance D is approximately the same as the distance T. If the position X were located any closer to the midcircumferential plane MP, there would be added weight without any appreciable added benefit from the extension of the ribs 49.

The ribs 49 on the exterior surface 51 of the shoulders 14 are located at circumferentially spaced positions about the tire 10 and extend from the junction portions 22 to the outer edges E of the tread.

Ribs 49 may be made of an elastomeric material such as rubber with suitable properties to reinforce the shoulders 14 as described herein. An example of a suitable material is an elastomeric rubber compound having a Shore A hardness ranging from 70 to 85, a static modulus greater than 45 kg/cm$^2$, a low hysteresis value, and low compression set value in the range of 10 percent when the compound is subjected to a 25-percent compression on a 24-hour test.

Ribs 49 are preferably molded to the respective surfaces of the tire 10 during curing or vulcanization. However, if desired, they may be formed, in accordance with good engineering practice, by any process and adhered to the respective tire surfaces in any manner either before or after the tire 10 has been cured.

Referring to FIG. 2, the ribs 49 are spaced apart so that a plurality of grooves 52 alternately lie between the ribs 49 so as to impart a generally corrugated appearance to the respective tire surfaces. Each of the ribs 49 is preferably located in a radial plane of the tire 10, but the angle formed by the ribs with the radial planes passing through the ribs may vary by as much as 10 degrees in either direction. The preferred cross-sectional configuration of the ribs 49, as shown in FIG. 2, is sinusoidal. However, other cross-sectional configurations may be used such as triangular or square-toothed.

A function of the ribs 49 is to strengthen and stiffen the shoulders 14 by reinforcing the tire 10 in the regions of the shoulders in the radial direction; i.e., in a direction generally perpendicular to the road surface upon which the tire 10 traverses to prevent engagement of the shoulders 14 with the ground while the deflated tire is traveling through the footprint. Each of the ribs 49 is thereby disposed to most efficiently provide such reinforcement with a minimum amount of material. Thus, optimum strength is provided due to the geometric disposition of the ribs 49 with a minimum addition of weight.

To further improve the reinforcement quality of the ribs 49 in the radial direction, both the ribs and grooves 52, respectively, on the inside and outside at the shoulders 14 are congruently spaced so that those on one side face those on the other side. Waviness of the cords of the ply reinforcement structure 30, which would otherwise normally tend to occur during the curing process, is also avoided by such spacing.

By "congruently spaced" is meant the ribs 49 and grooves 52 on surfaces 50 and 51 of the shoulders 14 are positioned opposite each other. This provides alternately a minimum thickness (e), as shown in FIG. 2, of the tire 10 at the shoulder 14 which is equal to the thickness of a shoulder without any ribs formed thereon and a maximum thickness (t) which is equal to the thickness of the shoulder plus the maximum thickness of a rib 49 on the interior surface 50 and the maximum thickness of a rib on the exterior surface 51.

The range of maximum thickness (t) at the shoulder 14 is dependent on load and tire dimensions. The ratio of minimum to maximum thickness (e/t) preferably ranges between 0.3 and 0.7. As used herein, the term "thickness" refers to a measurement in a radial plane along a line normal to the structure being measured.

The width (w) of one of the ribs 49 is the distance from a point on a groove 52 to a corresponding point on an adjacent groove. The total width of a number N of ribs 49 spaced side-by-side is equal to the product wN. The ratio, 2 w/t-e, preferably ranges between 0.5 and 5.

Referring again to FIGS. 1 and 3, in the preferred embodiment of this invention, three circumferentially continuous reinforcing strength members such as circumferential ribs 53 are formed on the exterior surface of each of the junction portions 22 for strengthening thereof. Each of the ribs 53 extends uninterruptedly circumferentially about the tire 10 to provide hoop strength. The ribs 53 are spaced apart to provide a corrugated surface and are made of an elastomeric material having sufficient strength to restrict lateral bulging in a direction axially outward of the tire 10 during operation of the tire while deflated. The ribs 53 also aid in constraining the sidewalls 16 between the junction portions 22 and rim 20 when the tire 10 is inflated. The circumferential ribs 53 may be molded to the surface of the tire 10 during curing. However, if desired, they may be formed by any process and adhered to the surface of the junction portions 22 in any manner consistent with good engineering design either before or after the tire 10 has been cured.

During operation of the tire 10 in a deflated condition, the sidewalls 16 flex so that the cross-sectional shape of the tire will appear substantially as that shown in FIG. 3. The sidewalls 16 may be made from an elastomeric compound having a modulus of elasticity of not less that 50 kg/cm$^2$ measured at 10 percent elongation. The sidewalls 16 also have a combination of bending stiffness, curvature, and thickness, determined in accordance with good engineering design, such as to constrain the sidewalls between the rim 20 and junction portions 22 at all operating conditions of the tire 10.

Chopped filaments or the like may be provided in the radial ribs 49 and circumferential ribs 53. Circumferentially extending bar members (not shown) may also be disposed between the ribs 49 providing cross-links for additional strength. A suitable lubricant 54 may be placed in the tire cavity to reduce the abrasion between the interior surfaces of the tire 10 and provide cooling of the tire during operation in the deflated condition.

Since it is not required that the mounting portions 18 have wire beads as are used in conventional tires, the rim 20 upon which the tire 10 is mounted is constructed to substantially enclose the mounting portions as shown in the drawings and to provide a means for retaining the mounting portions on the rim during use of the tire in the deflated condition.

The rim 20, as shown in FIG. 1, comprises a center ring 56 and two outer rings 58 and 60. The center ring 56 and one of the outer rings 58 or 60 substantially enclose each mounting portion 18 at the radially inner and axially inner and outer surfaces thereof. Mounting seats 62 and 64 are provided on the center ring 56 for sealing of the mounting portions 18 against the rim 20 to provide a tire cavity seal.

At least three self-locking retaining latches 66 spaced about the circumference of the rim 20 secure the rim assembly and retain the outer rings 58 and 60 against lateral forces; i.e., forces acting thereon in the axial direction. A safety screw (not shown) or similar fastener may be added to assure rim locking.

While certain representative embodiments and details have been shown for the purpose of illustrating the invention, it will be apparent to those skilled in the art that various changes and modifications may be made therein without departing from the spirit or scope of the invention.

I claim:

1. A pneumatic compression sidewall tire suitable for operating in an inflated or a deflated condition, comprising an annular body of elastomeric material, a circumferentially extending ground-engageable tread portion at the outer periphery of said body, a shoulder portion extending from each axially outer extremity of said tread portion and axially outward and radially inward from said outer extremity, a pair of spaced-apart mounting portions for mounting on a rim, a sidewall extending axially and radially outward from each mounting portion, a pair of junction portions respectively connecting the shoulder portions and sidewalls, the maximum section width of the tire being at the junction portions when the tire is under normal inflation pressure and load, the thickness of said shoulder portions being less than that of the sidewalls, a ply of reinforcing cords extending circumferentially around the tire and extending from each junction portion through a respective shoulder portion and at least to a point radially inward of the tread portion, means to maintain the shoulder portions out of engagement with the ground when the tire is deflated and under normal load, said means including a plurality of circumferentially spaced ribs on the interior and exterior surfaces of each shoulder portion, each rib being disposed at an angle of from 0 to 10 degrees relative to a radial plane of said tire passing through the rib, the ribs on the interior surface of each shoulder portion extending from the respective junction portion to a point axially inward of the respective axially outer edge of the tread, the ribs on the exterior surface of each shoulder portion extending from the respective junction portion to the respective axially outer edge of the tread, the ribs on the interior and exterior surfaces of each shoulder portion being congruently spaced whereby each shoulder portion has a minimum thickness which is equal to the thickness of the shoulder portion without any ribs formed thereon and has a maximum thickness which is equal to said minimum thickness plus the maximum thickness of a rib on the interior surface of the shoulder portion and the maximum thickness of a rib on the exterior surface of the shoulder portion.

2. A pneumatic compression sidewall tire as described in claim 1, wherein the ratio of minimum thickness to maximum thickness of each shoulder portion is between 0.3 and 0.7.

3. A pneumatic compression sidewall tire as described in claim 1, wherein the ratio of twice the width of each of said ribs to the maximum thickness less the minimum thickness of each shoulder portion is between 0.5 and 5.

4. A pneumatic compression sidewall tire as described in anyone of claims 1 through 3, wherein a bead is located in each of said junction portions, the ply of reinforcing cords in each junction portion being folded to form a turn-up around one of said beads, each bead being of an elastomeric material and having a modulus of elasticity of at least 100 kg per cm$^2$ at 10% elongation.

5. A pneumatic compression sidewall tire as described in any one of claims 1 through 3, wherein a plurality of circumferentially continuous reinforcing ribs are provided on the exterior surface of each of said junction portions with each said circumferentially continuous rib extending uninterruptedly circumferentially about the tire to provide hoop strength and being made of an elastomeric material having sufficient strength to restrict lateral bulging of the tire in a direction axially outwardly thereof during operation of the tire while deflated.

6. A pneumatic compression sidewall tire as described in any one of claims 1 through 3, wherein a plurality of circumferentially continuous reinforcing ribs are provided on the exterior surface of each of said junction portions with each said circumferentially continuous rib extending uninterruptedly circumferentially about the tire to provide hoop strength and being made of an elastomeric material having sufficient strength to restrict lateral bulging of the tire in a direction axially outwardly thereof during operation of the tire while deflated and wherein each said circumferentially continuous rib has a modulus of elasticity greater than 50 kg per cm$^2$ measured at 10% elongation.

7. A pneumatic compression sidewall tire as described in any one of claims 1 through 3, wherein a plurality of circumferentially continuous reinforcing ribs are provided on the exterior surface of each of said junction portions with each said circumferentially continuous rib extending uninterruptedly circumferentially about the tire to provide hoop strength and being made of an elastomeric material having sufficient strength to restrict lateral bulging of the tire in a direction axially outwardly thereof during operation of the tire while deflated, and wherein a bead is located in each of said junction portions, the ply of reinforcing cords in each junction portion being folded to form a turn-up around one of said beads, each bead being of an elastomeric material and having a modulus of elasticity of at least 100 kg per cm$^2$ measured at 10% elongation.

8. A pneumatic compression sidewall tire as described in any one of claims 1 through 3, wherein a plurality of circumferentially continuous reinforcing ribs are provided on the exterior surface of each of said junction portions with each said circumferentially continuous rib extending uninterruptedly circumferentially about the tire to provide hoop strength and being made of an elastomeric material having sufficient strength to restrict lateral bulging of the tire in a direction axially outwardly thereof during operation of the tire while deflated, and wherein each said circumferentially continuous rib has a modulus of elasticity greater than 50 kg per cm$^2$ measured at 10% elongation, and wherein a bead is located in each of said junction portions, the ply of reinforcing cords in each junction portion being folded to form a turn-up around one of said beads, each bead being of an elastomeric material and having a modulus of elasticity of at least 100 kg per cm$^2$ at 10% elongation.

* * * * *